United States Patent [19]
Wakamiya

[11] 4,394,073
[45] Jul. 19, 1983

[54] COMPACT WIDE ANGLE LENS
[75] Inventor: Koichi Wakamiya, Tokyo, Japan
[73] Assignee: Nippon Kogaku K.K., Tokyo, Japan
[21] Appl. No.: 214,887
[22] Filed: Dec. 10, 1980
[30] Foreign Application Priority Data
  Dec. 28, 1979 [JP] Japan .................... 54-1721198
[51] Int. Cl.³ .................................................. G02B 9/60
[52] U.S. Cl. ...................................... 350/465; 350/450
[58] Field of Search ........................ 350/465, 455, 450
[56] References Cited
  U.S. PATENT DOCUMENTS
  4,124,276 11/1978 Okano et al. ................... 350/465
  4,204,747 5/1980 Imai ................................ 350/216

Primary Examiner—John K. Corbin
Assistant Examiner—Rebecca D. Gass
Attorney, Agent, or Firm—Shapiro and Shapiro

[57] ABSTRACT

A compact wide angle lens comprises, in succession from the object side, a first component which is a positive meniscus lens having its convex surface facing the object side, a second component which is a biconcave lens, a third component which is a positive lens having its surface of sharper curvature facing the object side, a fourth component which is a positive lens, and a fifth component which is a negative meniscus lens having its convex surface facing the image side.

6 Claims, 12 Drawing Figures

SPHERICAL ABERRATION
F 2.8

ASTIGMATISM
α=31°
MERIDIONAL RAYS
SAGITTAL RAYS

DISTORTION
31°

SPHERICAL ABERRATION

ASTIGMATISM

DISTORTION

SPHERICAL ABERRATION

ASTIGMATISM

DISTORTION

COMPACT WIDE ANGLE LENS

BACKGROUND OF THE INVENTION

1. Field of the Invention

This invention relates to improvements in a wide angle lens having an angle of view of 60°-70° and an F-number of the order of 2.8.

2. Description of the Prior Art

In order to shorten the total length of a lens (the distance from the foremost surface of the lens to the focal plane thereof), it is known to adopt a so-called telephoto type optical system comprising a convergent forward group and a divergent rearward group. A wide angle lens using this technique is disclosed in Japanese Laid-open Patent Application No. 76147/1979 (corresponding U.S. Pat. No. 4,204,747), and this is surely shorter in total length than former wide angle lenses and succeeds in shortening the total length to the same degree as the focal length. On the other hand, however, it is a wide angle lens having a large angle of view and, therefore, the aperture of the lenses in the rearward group, particularly the lens most adjacent to the image side, is very large. Such a wide angle lens cannot be said to be compact, and it has other disadvantages. That is, if the aperture of the rearward lens is large, a large space will be required in a camera body to which such lens is mounted, and this is disadvantageous in making the camera compact. Further, the marginal light beam may be forced to possibly promote the disadvantage of a wide angle lens in which the quantity of marginal light is originally small.

SUMMARY OF THE INVENTION

It is an object of the present invention to provide a more compact wide angle lens which has a total length as short as the focal length thereof and yet in which the aperture of the rearward lens is small.

The invention will become fully apparent from the following detailed description thereof taken in conjunction with the accompanying drawings.

DESCRIPTION OF THE PREFERRED EMBODIMENTS

Figure 1:
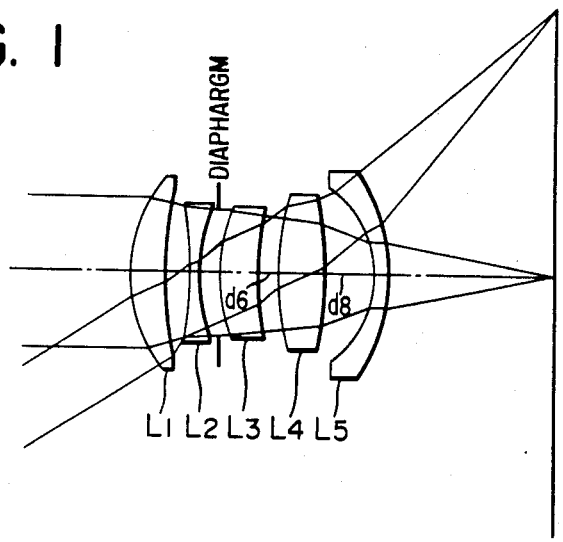
FIG. 1 is a cross-sectional view of a lens according to a first embodiment of the present invention.
Figure 2A:
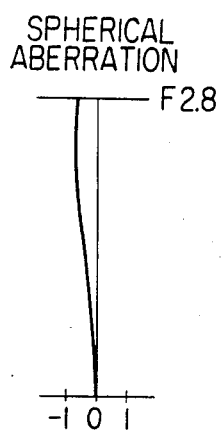
FIGS. 2A-2C illustrate the various aberrations in the first embodiment.
Figure 2B:
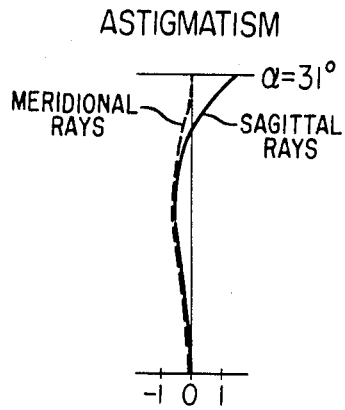
Figure 2C:
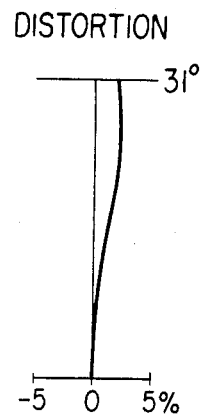

The wide angle lens according to the present invention employs a negative lens as the lens located most adjacent to the image side while basically employing the telephoto type system, to thereby enable a decrease in the lens aperture and to sufficiently well correct the correspondingly occurring aberrations such as distortion, etc. by satisfying certain conditions. Specifically, the wide angle lens of the present invention has, in succession from the object side, a first component $L_1$ which is a positive meniscus lens having its convex surface facing the object side, a second component $L_2$ which is a biconcave lens, a third component $L_3$ which is a positive lens having its surface of sharper curvature facing the object side, a fourth component $L_4$ which is a positive lens, and a fifth component $L_5$ which is a negative meniscus lens having its convex surface facing the image side. Desirably, the wide angle lens satisfies the following conditions:

$$0.57f < f_1 < 0.74f \tag{1}$$

$$0.51f < f_4 < 1.38f \tag{2}$$

$$d_8 < 0.15f \tag{3}$$

$$0.02f < d_6 < 0.12f \tag{4}$$

where f represents the total focal length of the entire system, $f_1$ and $f_4$ represent the focal lengths of the first component $L_1$ and the fourth component $L_4$, respectively, $d_6$ represents the air space between the third component $L_3$ and the fourth component $L_4$, and $d_8$ represents the air space between the fourth component $L_4$ and the fifth component $L_5$. A diaphragm may desirably be provided between the second component $L_2$ and the third component $L_3$ or between the third component $L_3$ and the fourth component $L_4$.

Generally, to shorten the total length of a lens, as the aforementioned telephoto type is typical, it is effective to intensify the refractive powers (the inverse number of the focal length) of the positive lens located adjacent to the object side and the negative lens located adjacent to the image side. In this regard, in the construction of the present invention, the first component $L_1$, which is a positive meniscus lens having its convex surface facing the object side, and the fifth component $L_5$, which is a negative meniscus lens having its convex surface facing the image side, are closely related to each other with respect to the distribution of refractive power. From this point of view, condition (1) prescribes the focal length $f_1$ of the first component $L_1$. Where the refractive power of the first component $L_1$ is weakened, the refractive power of the fifth component $L_5$ must be intensified to keep the total length of the lens short, and, if the refractive power of the first component $L_1$ becomes smaller than the upper limit of condition (1), the various aberrations will greatly increase in the fifth component $L_5$ and it will become difficult to correct the various aberrations in a well-balanced manner. As the refractive power of the first component $L_1$ is intensified, the total length of the lens can be made shorter, but if the refractive power becomes greater than the lower limit of condition (1), the negative spherical aberration caused by the first component $L_1$ will increase too much to enable it to be sufficiently well corrected even by the other components.

In the construction of the present invention, the diaphragm is disposed between the second and the third component or between the third and the fourth component and, in any case, the principal ray of oblique light rays is subjected to the converging action of the first component $L_1$. Therefore, positive distortion occurs here, and after the principal ray has passed through the diaphragm, the distortion will increase in the positive direction due to the diverging action of the fifth component $L_5$, thus resulting in excessively large positive distortion. Conditions (2) and (3) are provided to correct this. Condition (2) is concerned with the focal length $f_4$ of the fourth component $L_4$, which is a positive lens, and it is for correcting the positive distortion by causing negative distortion to occur due to the converging action of this component. But if the upper limit of this condition is exceeded, the converging action will become small and sufficient correction will become impossible. Also, the function of the fourth component $L_4$ is to make the incidence position of the light beam to the fifth component $L_5$ near to the optical axis due to the converging action thereof and to reduce the diverging action imparted by the fifth component, as well as to keep the aperture of the fifth component small. From this point of view, it is disadvantageous if the upper limit of condition (2) is exceeded. Conversely, if the lower limit of condition (2) is departed from, the refractive power of the fourth component $L_4$ will become strong and, in order to provide a desired converging action as to the entire lens system under condition (1), the converging action of the third component $L_3$ must be reduced. By this, the principal point of the entire system will be moved toward the image side and necessarily the total length of the lens will become large. Also, in this case, large negative spherical aberration will occur, which may be corrected by weakening the refractive power of the third component $L_3$. But doing so will likewise result in an increased total length of the lens, which is contrary to the object of the present invention.

Condition (3) is concerned with the air space $d_8$ between the fourth component $L_4$ and the fifth component $L_5$ and it is for correcting distortion in combination with said condition (2). The light beam exitting from the fourth component $L_4$ is subjected to the converging action of this component, but oblique light rays are in a direction away from the optical axis. Therefore, if the air space $d_8$ becomes large, the incidence positive to the fifth component $L_5$ will become high and the diverging action imparted by this component tends to become strong. If the air space $d_8$ exceeds condition (3), the diverging action in the fifth component $L_5$ will become unnecessarily large and it will become difficult to correct distortion. Further, in this case, the effective diameter of the fifth component $L_5$ will become excessively large, contrary to the object of the present invention. Accordingly, a smaller value for this air space $d_8$ is more advantageous. However, since the fifth component $L_5$ is a negative meniscus lens and the surface thereof adjacent to the fourth component $L_4$ is a concave surface of considerably sharp curvature, there is a danger that the fifth component may contact the fourth component $L_4$ in the marginal portion thereof. Therefore, it is desirable that the air space $d_8$ be greater than $0.05f$.

Condition (4) is for prescribing the air space $d_6$ between the third component $L_3$ and the fourth component $L_4$ to enable good correction of the curvature of the image field. If the upper limit of this condition is exceeded, the meridional image plane will be sharply curved positively, and if the lower limit of this condition is departed from, the meridional image plane will be sharply curved negatively. In any case, even if the meridional image plane can be corrected by the other components, the astigmatic difference will become large and it will be difficult to obtain a good image plane. In the present invention, high dispersion flint glass is used for the second component $L_2$, and the forward three components $L_1$, $L_2$ and $L_3$ have a construction similar to that of the conventional triplet or tessar type lens, but the combined focal length $f_{12}$ of the first component $L_1$ and the second component $L_2$ should desirably be designed to $\infty$ or negative, namely, to a touch of divergence. According to this, the diverging action of the second component $L_2$ can be intensified and the correction of the chromatic aberration of the entire lens system according to the present invention can be accomplished more effectively.

Figure 3:
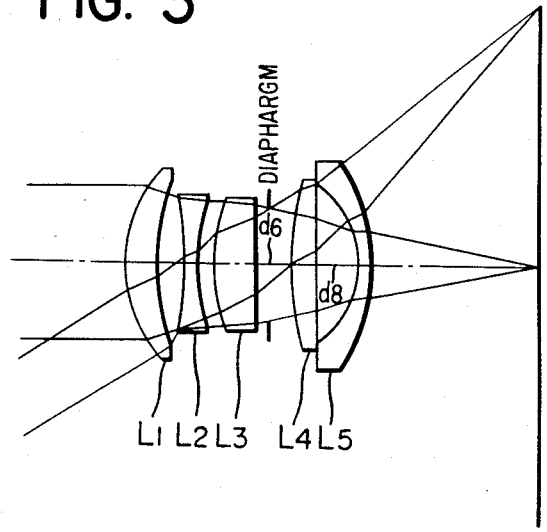
FIG. 3 is a cross-sectional view of a lens according to a second embodiment of the present invention.
Figure 4A:
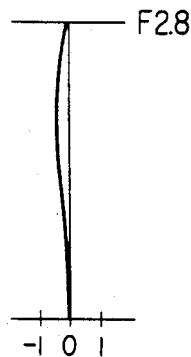
FIGS. 4A-4C illustrate the various aberrations in the second embodiment.
Figure 4B:
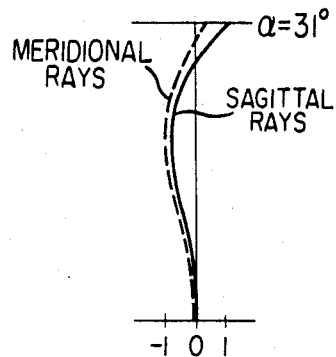
Figure 4C:
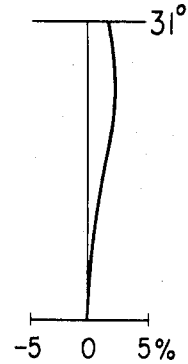
Figure 5:
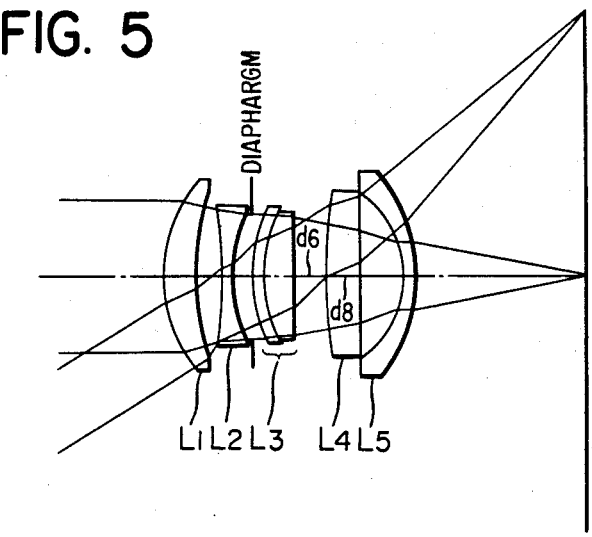
FIG. 5 is a cross-sectional view of a lens according to a third embodiment of the present invention.
Figure 6A:
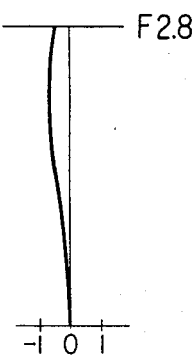
FIGS. 6A-6C illustrate the various aberrations in the third embodiment.
Figure 6B:
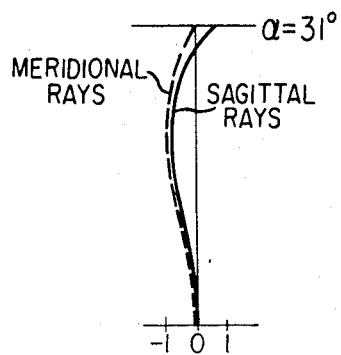
Figure 6C:
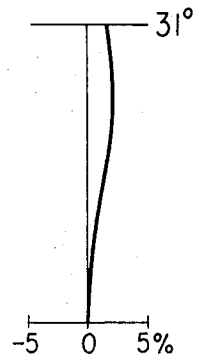

Embodiments of the present invention will hereinafter be described. A first embodiment of the present invention, as shown in the lens construction view of FIG. 1, has a diaphragm between the second component $L_2$ and the third component $L_3$. A second embodiment shown in FIG. 3 has a diaphragm between the third component $L_3$ and the fourth component $L_4$ and in other respects, it is substantially similar to the first embodiment. A third embodiment, as shown in FIG. 5, has a diaphragm between the second and the third component similarly to the first embodiment, but a cemented surface is provided on the third component $L_3$ to thereby further improve the chromatic aberration.

Numerical data of each embodiment will be shown below, and the various aberrations in the first, second and third embodiments are illustrated in FIGS. 2A–2C, 4A–4C and 6A–6C, respectively. In the tables below, r represents the radius of curvature of each lens surface, d represents the center thicknesses of and the air spaces between the respective lenses, n and $\nu$ represent the refractive index and the Abbe number, respectively, of each lens, and the subscripts represent the order from the object side.

Focal length f = 100 F 2.8 Angle of view 62°

First Embodiment

$L_1 \begin{cases} r_1 = 33.422 & d_1 = 8.570 & n_1 = 1.77279 & \nu_1 = 49.4 \\ r_2 = 86.715 & d_2 = 5.713 \end{cases}$ $L_2 \begin{cases} r_3 = -193.623 & d_3 = 2.857 & n_2 = 1.78470 & \nu_2 = 26.1 \\ r_4 = 44.440 & d_4 = 4.571 \end{cases}$ $L_3 \begin{cases} r_5 = 38.296 & d_5 = 9.998 & n_3 = 1.62374 & \nu_3 = 47.0 \\ r_6 = 108.753 & d_6 = .4.285 \end{cases}$ $L_4 \begin{cases} r_7 = 92.359 & d_7 = 11.141 & n_4 = 1.80740 & \nu_4 = 35.4 \\ r_8 = -131.181 & d_8 = 12.283 \end{cases}$ $L_5 \begin{cases} r_9 = -22.687 & d_9 = 2.857 & n_5 = 1.78797 & \nu_5 = 47.5 \\ r_{10} = -42.682 \end{cases}$ $\Sigma d = 62.274$
Back focal length: $Bf = 40.415$
Total length: $T.L = 102.689 = 10.27f$
$f_1 = 65.8 = 0.658f$
$f_4 = 68.7 = 0.687f$
$f_{12} = -539.6$

Second Embodiment

$L_1 \begin{cases} r_1 = 32.280 & d_1 = 8.570 & n_1 = 1.77279 & \nu_1 = 49.4 \\ r_2 = 76.797 & d_2 = 5.713 \end{cases}$ $L_2 \begin{cases} r_3 = -203.021 & d_3 = 2.857 & n_2 = 1.78470 & \nu_2 = 26.1 \\ r_4 = 42.069 & d_4 = 4.571 \end{cases}$ $L_3 \begin{cases} r_5 = 36.999 & d_5 = 9.998 & n_3 = 1.62374 & \nu_3 = 47.0 \\ r_6 = -8133.457 & d_6 = 9.141 \end{cases}$ $L_4 \begin{cases} r_7 = 100.449 & d_7 = 5.428 & n_4 = 1.80740 & \nu_4 = 35.4 \\ r_8 = -592.361 & d_8 = 10.284 \end{cases}$ $L_5 \begin{cases} r_9 = 22.130 & d_9 = 2.857 & n_5 = 1.78797 & \nu_5 = 47.5 \\ r_{10} = -40.439 \end{cases}$ $\Sigma d = 59.417$
Back focal length: $Bf = 40.387$ -continued

| Focal length f = 100 F 2.8 Angle of view 62° |
|---|
| Total length: T.L. = 99.804 = 0.998f |
| $f_1$ = 66.5 = 0.665f |
| $f_4$ = 106.7 = 1.067f |
| $f_{12}$ = −388.0 |

Third Embodiment

| | | | | |
|---|---|---|---|---|
| $L_1$ { $r_1$ = 32.565 | $d_1$ = 8.570 | $n_1$ = 1.78100 | $\nu_1$ = 44.5 |
|     $r_2$ = 74.220 | $d_2$ = 5.713 | | |
| $L_2$ { $r_3$ = −204.935 | $d_3$ = 2.857 | $n_2$ = 1.78472 | $\nu_2$ = 25.7 |
|     $r_4$ = 42.997 | $d_4$ = 4.571 | | |
| $L_3$ { $r_5$ = 38.167 | $d_5$ = 2.857 | $n_3$ = 1.62374 | $\nu_3$ = 47.0 |
|     $r'_5$ = 30.280 | $d'_5$ = 7.142 | $n_4$ = 1.62230 | $\nu'_3$ = 53.1 |
|     $r_6$ = −2093.039 | $d_6$ = 7.999 | | |
| $L_4$ { $r_7$ = 105.514 | $d_7$ = 8.570 | $n_5$ = 1.79504 | $\nu_4$ = 28.4 |
|     $r_8$ = −458.112 | $d_8$ = 10.284 | | |
| $L_5$ { $r_9$ = −22.159 | $d_9$ = 2.857 | $n_6$ = 1.78797 | $\nu_5$ = 47.5 |
|     $r_{10}$ = −39.381 | | | |

Σd = 61.417
Back focal length: Bf = 40.223
Total length: T.L. = 101.640 = 1.016f
$f_1$ = 68.1 = 0.681f
$f_4$ = 108.6 = 1.086f
$f_{12}$ = −374.9

According to the present invention as described above, a more compact wide angle lens can be provided which has the total length thereof kept as short as the focal length thereof and yet in which the effective diameter of the lens most adjacent to the image side is 0.46f to 0.48f, which is considerably smaller than 0.56f to 0.58f which is the effective diameter of the lens most adjacent to the image side in the conventional wide angle lens disclosed in Japanese Laid-open Patent Application No. 76147/1979 (corresponding U.S. Pat. No. 4,204,747), and which has a sufficiently good imaging performance in practical use.

I claim:

1. A compact wide angle lens system having an angle of view of 60°–70° and a total length as short as the total focal length, f, of the lens system, comprising, in succession from the object side, a first positive meniscus lens component having its convex surface facing the object side, a second biconcave lens component, a third positive lens component having its surface of sharper curvature facing the object side, a fourth positive lens component, and a fifth negative meniscus lens component having its convex surface facing the image side, the lens system satisfying the condition:

$$0.51f < f_4 < 1.38f$$

where $f_4$ represents the focal length of said fourth component.

2. A compact wide angle lens system according to claim 1, further satisfying the following conditions:

$$0.57 < f_1 < 0.74f$$

$$d_8 < 0.15f$$

$$0.02f < d_6 < 0.12f$$

where $f_1$ represents the focal length of said first component, $d_6$ represents the air space between said third component and said fourth component, and $d_8$ represents the air space between said fourth component and said fifth component.

3. A compact wide angle lens system according to claim 2, wherein numerical data are as follows:

| Focal length f = 100, F = 2.8, Angle of view = 62° |
|---|
| $L_1$ { $r_1$ = 33.422   $d_1$ = 8.570   $n_1$ = 1.77279   $\nu_1$ = 49.4 |
|     $r_2$ = 86.715   $d_2$ = 5.713 |
| $L_2$ { $r_3$ = −193.623   $d_3$ = 2.857   $n_2$ = 1.78470   $\nu_2$ = 26.1 |
|     $r_4$ = 44.440   $d_4$ = 4.571 |
| $L_3$ { $r_5$ = 38.296   $d_5$ = 9.998   $n_3$ = 1.62374   $\nu_3$ = 47.0 |
|     $r_6$ = 108.753   $d_6$ = 4.285 |
| $L_4$ { $r_7$ = 92.359   $d_7$ = 11.141   $n_4$ = 1.80740   $\nu_4$ = 35.4 |
|     $r_8$ = −131.181   $d_8$ = 12.283 |
| $L_5$ { $r_9$ = −22.687   $d_9$ = 2.857   $n_5$ = 1.78797   $\nu_5$ = 47.5 |
|     $r_{10}$ = −42.682 |
| Σd = 62.274 |
| wherein: Back focal length: Bf = 40.415 |
| Total length: T.L. = 102.689 = 1.027f |
| $f_1$ = 65.8 = 0.658f |
| $f_4$ = 68.7 = 0.687f |
| $f_{12}$ = −539.6 | and wherein L represents a lens component, r represents the radius of curvature of a lens surface, d represents the center thickness of and the air space between respective lenses, n and ν represent refractive index and Abbe number, respectively, the subscripts represent order from the object side, and $f_{12}$ represents the combined focal length of the first and second components.

4. A compact wide angle lens system according to claim 2, wherein numerical data are as follows:

| Focal length f = 100, F = 2.8, Angle of view = 62° |
|---|
| $L_1$ { $r_1$ = 32.280   $d_1$ = 8.570   $n_1$ = 1.77279   $\nu_1$ = 49.4 |
|     $r_2$ = 76.797   $d_2$ = 5.713 |
| $L_2$ { $r_3$ = −203.021   $d_3$ = 2.857   $n_2$ = 1.78470   $\nu_2$ = 26.1 |
|     $r_4$ = 42.069   $d_4$ = 4.571 |
| $L_3$ { $r_5$ = 36.999   $d_5$ = 9.998   $n_3$ = 1.62374   $\nu_3$ = 47.0 |
|     $r_6$ = −8133.457   $d_6$ = 9.141 |
| $L_4$ { $r_7$ = 100.449   $d_7$ = 5.428   $n_4$ = 1.80740   $\nu_4$ = 35.4 |
|     $r_8$ = −592.361   $d_8$ = 10.284 |
| $L_5$ { $r_9$ = −22.130   $d_9$ = 2.857   $n_5$ = 1.78797   $\nu_5$ = 47.5 |
|     $r_{10}$ = −40.439 |
| Σd = 59.417 |
| wherein: Back focal length: Bf = 40.387 |
| Total length: T.L. = 99.804 = 0.998f |
| $f_1$ = 66.5 = 0.665f |
| $f_4$ = 106.7 = 1.067f |
| $f_{12}$ = −388.0 | and wherein L represents a lens component, r represents the radius of curvature of a lens surface, d represents the center thickness of and the air space between respective lenses, n and ν represent refractive index and Abbe number, respectively, the subscripts represent order from the object side, and $f_{12}$ represents the combined focal length of the first and second components.

5. A compact wide angle lens according to claim 2, wherein numerical data are as follows:

| Focal length f = 100, F = 2.8, Angle of view = 62° | | | | |
|---|---|---|---|---|
| $L_1$ { $r_1$ = 32.565 | $d_1$ = 8.570 | $n_1$ = 1.78100 | $\nu_1$ = 44.5 |
| $r_2$ = 74.220 | $d_2$ = 5.713 | | |
| $L_2$ { $r_3$ = −204.935 | $d_3$ = 2.875 | $n_2$ = 1.78472 | $\nu_2$ = 25.7 |
| $r_4$ = 42.997 | $d_4$ = 4.571 | | |
| $L_3$ { $r_5$ = 38.167 | $d_5$ = 2.857 | $n_3$ = 1.62374 | $\nu_3$ = 47.0 |
| $r'_5$ = 30.280 | $d'_5$ = 7.142 | $n_4$ = 1.62230 | $\nu'_3$ = 53.1 |
| $r_6$ = −2093.039 | $d_6$ = 7.999 | | |
| $L_4$ { $r_7$ = 105.514 | $d_7$ = 8.570 | $n_5$ = 1.79504 | $\nu_4$ = 28.4 |
| $r_8$ = −458.112 | $d_8$ = 10.284 | | |
| $L_5$ { $r_9$ = −22.159 | $d_9$ = 2.857 | $n_6$ = 1.78797 | $\nu_5$ = 47.5 |
| $r_{10}$ = −39.381 | | | |
| $\Sigma d$ = 61.417 | | | | wherein: Back focal length: Bf = 40.223
Total length: T.L = 101.640 = 1.016f
$f_1$ = 68.1 = 0.681f
$f_4$ = 108.6 = 1.086f
$f_{12}$ = −374.9 and wherein L represents a lens component, r represents the radius of curvature of a lens surface, d represents the center thickness of and the air space between respective lenses, n and ν represent refractive index and Abbe number, respectively, the subscripts represent order from the object side, and $f_{12}$ represents the combined focal length of the first and second components.

6. A compact wide angle lens system according to claim 1, wherein the second lens component is formed of high dispersion flint glass.

* * * * *